(12) United States Patent
Wolfe et al.

(10) Patent No.: US 11,439,153 B2
(45) Date of Patent: Sep. 13, 2022

(54) CONVEYOR TUNNEL OVEN

(71) Applicant: Wolfe Electric, Inc., Wichita, KS (US)

(72) Inventors: Ronald D. Wolfe, Wichita, KS (US);
Jayson S. Rohrback, Wichita, KS (US); Morgan M. Breth, Wichita, KS (US); James L. Vasher, Wichita, KS (US)

(73) Assignee: WOLFE ELECTRIC, INC., Wichita, KS (US)

( * ) Notice: Subject to any disclaimer, the term of this patent is extended or adjusted under 35 U.S.C. 154(b) by 294 days.

(21) Appl. No.: 16/803,621

(22) Filed: Feb. 27, 2020

(65) Prior Publication Data

US 2020/0187510 A1 Jun. 18, 2020

(51) Int. Cl.
| | |
|---|---|
| *A21B 1/48* | (2006.01) |
| *A21B 3/07* | (2006.01) |
| *B65G 15/54* | (2006.01) |
| *B65G 47/64* | (2006.01) |
| *B65G 47/56* | (2006.01) |
| *B65G 39/00* | (2006.01) |
| *B65G 47/90* | (2006.01) |

(52) U.S. Cl.
CPC ............... *A21B 1/48* (2013.01); *A21B 3/07* (2013.01); *B65G 15/54* (2013.01); *B65G 39/00* (2013.01); *B65G 47/56* (2013.01); *B65G 47/64* (2013.01); *B65G 47/902* (2013.01)

(58) Field of Classification Search
CPC .. A21B 1/48; A21B 3/07; B65G 47/56; B65G 47/64; B65G 47/901; B65G 47/902; B65G 47/90; B65G 47/912; B65G 47/914; B25J 9/026; B25J 9/0093; B25J 9/0096; B25J 9/0018
See application file for complete search history.

(56) References Cited

U.S. PATENT DOCUMENTS

| | | | | |
|---|---|---|---|---|
| 3,061,111 | A * | 10/1962 | Riemenschneider | ... B66C 13/26 414/277 |
| 3,168,955 | A * | 2/1965 | Black | .................... B60F 3/0061 114/366 |
| 5,277,105 | A * | 1/1994 | Bruno | ................... F24C 15/025 99/476 |
| 6,662,710 | B1 * | 12/2003 | Kemppainen | ............ A21B 3/07 99/427 |

(Continued)

*Primary Examiner* — William R Harp
(74) *Attorney, Agent, or Firm* — Kenneth H. Jack; Davis & Jack, L.L.C.

(57) ABSTRACT

A conveyor tunnel oven incorporating a baking case opened by longitudinal and oppositely longitudinal food passage ports; a first conveyor extending through the at least baking case, the first conveyor being adapted for carrying the food item therethrough, a second conveyor supported at the oppositely longitudinal end of the baking case, the second conveyor being adapted for carrying the food item longitudinally toward or away from the food passage port; a third conveyor carried by the second conveyor, the third conveyor being adapted for carrying the food item laterally toward or away from the food passage port; a fourth conveyor carried by the third conveyor, the fourth conveyor being adapted for orbiting the food item; and a fifth conveyor carried by the fourth conveyor, the fifth conveyor having food item engaging arms and being adapted for moving the food item upwardly or downwardly.

14 Claims, 3 Drawing Sheets

(56) References Cited

U.S. PATENT DOCUMENTS

| | | | | |
|---|---|---|---|---|
| 6,688,213 | B2 * | 2/2004 | Pasch | A21C 13/02 |
| | | | | 99/440 |
| 8,113,108 | B2 * | 2/2012 | Weiss | G07F 11/42 |
| | | | | 219/400 |
| 8,536,493 | B1 * | 9/2013 | Wolfe | A21B 1/245 |
| | | | | 219/400 |
| 2010/0251905 | A1 * | 10/2010 | Baumeister | A21C 9/083 |
| | | | | 99/443 R |
| 2019/0297899 | A1 * | 10/2019 | Weiss | A21B 7/00 |
| 2020/0238534 | A1 * | 7/2020 | Goldberg | B25J 9/0093 |

* cited by examiner

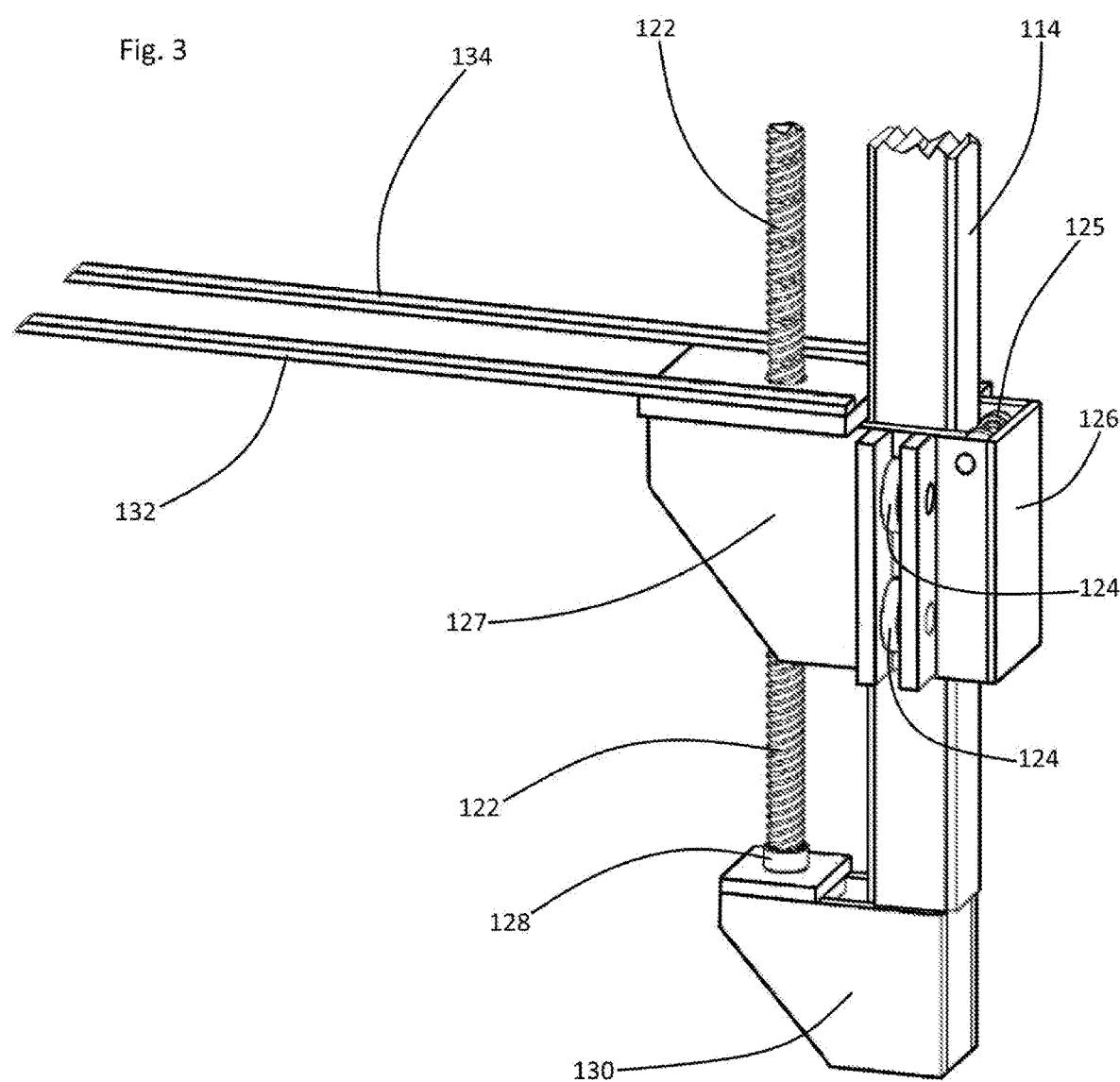

CONVEYOR TUNNEL OVEN

FIELD OF THE INVENTION

This invention relates to conveyor tunnel ovens of the type which incorporate vertically stacked baking cases and include grate type continuous loop food item carrying conveyors which extend longitudinally through the baking cases.

BACKGROUND OF THE INVENTION

Vertically stacked tunnel ovens which are adapted for cooking and baking food items such as pizzas are known to include conveyors of the type which turn and cycle continuous loops or belts. Such belts are commonly configured as steel wire cooking grates which extend along longitudinal axes through the stacked baking cases, such grates carrying the food items from, for example, the cases' oppositely longitudinal food passage ports to their longitudinal food passage ports. While such tunnel ovens may substantially automatically carry the food items to be cooked longitudinally through their interior baking spaces, their conveyors are typically incapable of performing other needed food item conveying tasks which are necessarily performed at the entrance and exit ports which open the baking cases.

The instant inventive oven overcomes such deficiencies of commonly known conveyor tunnel ovens by adapting such ovens to include additional conveyors which are operatively mounted at the longitudinal or oppositely longitudinal ends of the oven's cases.

BRIEF SUMMARY OF THE INVENTION

A first structural component of the instant inventive conveyor tunnel oven comprises an at least first baking case having an upper ceiling or wall and a lower or downward floor. The at least first baking case component has lateral and oppositely lateral ends, the lateral end of the baking case preferably comprising a removable front wall or access panel. The at least first baking case further has longitudinal and oppositely longitudinal ends or walls, and such case is conventionally opened at such ends or walls by laterally oblongated food passage ports.

The instant inventive conveyor tunnel oven further conventionally comprises a first conveyor which extends through the at least first baking case in alignment with a longitudinally extending axis. Such first conveyor component is commonly adapted for carrying a food item such as an uncooked pizza from one of the ports among the oven's longitudinal and oppositely longitudinal food passage ports to the oven's other food passage port. In examples discussed below, such food item carriage may be assumed to move an exemplary uncooked pizza in a longitudinal direction which extends along the baking case's longitudinal axis. In a preferred embodiment of the instant invention, the first conveyor component comprises a wire grate type continuous loop belt which is supported by longitudinal axle mounted idler sprockets and is driven by oppositely longitudinal axle mounted drive sprockets.

A further structural component of the instant inventive conveyor tunnel oven comprises a second conveyor which is operatively supported and positioned at the oppositely longitudinal end of the at least first baking case. In a preferred embodiment, such operative support is provided by a pair of support beams which have proximal ends fixedly attached at the upper end of the at least first baking case, the distal ends of such beams cantilevering oppositely longitudinally from the at least first baking case's oppositely longitudinal wall. In the preferred embodiment, the second conveyor component is adapted for carrying food items, and other conveyor components discussed below, longitudinally or oppositely longitudinally with respect to the tunnel oven's oppositely longitudinal food passage port.

Where the tunnel oven's oppositely longitudinal food passage port is characterized as being an intake port for receipt of uncooked food items (with the upper flight of the first conveyor traveling longitudinally), the invention's second conveyor component may be correspondingly characterized as being primarily adapted for carrying the uncooked food items in the longitudinal direction toward such port. Alternatively, where the tunnel oven's oppositely longitudinal food passage port is characterized as being an output port which dispenses cooked food items, the second conveyor component may be alternatively recognized as being primarily adapted for carrying such food items in the oppositely longitudinal direction away from such oppositely longitudinal food passage port.

A further structural component of the instant inventive conveyor tunnel oven comprises a third conveyor which is preferably operatively connected to and is carried by the second conveyor. In the preferred embodiment, the third conveyor component is adapted for carrying the food items in a lateral or oppositely lateral direction with respect to the oppositely longitudinal food passage port.

A further structural component of the instant inventive conveyor tunnel oven comprises a fourth conveyor which is preferably operatively connected to and is carried by the third conveyor. In the preferred embodiment, the fourth conveyor component extends along a vertical axis and is adapted for carrying the food items orbitally about that axis.

A further structural component of the instant inventive conveyor tunnel oven comprises a fifth conveyor which is connected operatively to and is carried by the fourth conveyor. In the preferred embodiment, the fifth conveyor component incorporates at least a first and preferably a pair of food item engaging arms, and such conveyor is adapted to thereby carry the food items upwardly or downwardly with respect to the oppositely longitudinal food passage port.

In use and operation of the instant inventive conveyor tunnel oven, a food item such as an uncooked pizza contained within a pizza cooking pan may, for example, initially reside within a storage rack which is positioned at or near the oppositely longitudinal end of the conveyor tunnel oven. Thereafter, the fifth conveyor component may be operated to vertically raise or lower the food item engaging arms to match the elevation of the uncooked pizza and pizza pan.

Either simultaneously or subsequently, the fourth conveyor component may be operated to orbitally rotate the food item engaging arms until such arms extend toward the uncooked pizza and pan. Thereafter, or suitably simultaneously, the second and third conveyors may be operated to move such arms horizontally toward the pizza and pan until such arms engage and commence supporting such pizza and pan, such engagement lifting the pizza and pan off the storage rack.

Thereafter, reversals of such conveyor operations may effectively transfer the uncooked pizza and pan from the storage rack to the oppositely longitudinal end of the at least first baking case's first conveyor component. Thereafter, such first conveyor may carry the uncooked pizza longitudinally through the at least first baking case.

In accordance with the instant invention, the second, third, fourth, and fifth conveyor components may be replicated or mirroringly supported at the longitudinal end of the at least first baking case for similar automated transfers of cooked pizzas from the at least first baking case's longitudinal output end to a closely associated processing station or location at which, for example, pizza cutting and boxing may take place.

In the preferred embodiment of the instant inventive conveyor tunnel oven a plurality of second baking cases is provided, such plurality suitably comprising as few as a single second baking case. Each second baking case preferably underlies and is stacked beneath the at least first baking case, the at least first baking case being recognized as the tunnel oven's uppermost baking case.

Where the plurality of second baking cases is provided, a plurality of sixth conveyors is also preferably provided, each sixth conveyor extending longitudinally through the interior of one of the second baking cases in a fashion similar to the first conveyor's extension through the at least first baking case.

In a preferred embodiment of the instant inventive conveyor tunnel oven, the second and third conveyors respectively comprise first and second carriages, each such carriage preferably being configured as a rigid rectangular frame which supports and presents a series of rollers in a frame supporting rectangular array. Where the second conveyor component is supported by cantilevering beams which extend from the top of the at least first baking case, inner surfaces of such beams may support and present roller tracks which are aligned with the longitudinal axis for rolling engagements with the first carriage's rollers.

In a like manner, laterally extending frame members of the first carriage may include attached roller tracks which rollably engage the second carriage's rollers. Such preferred configuration of track and roller assemblies mounted upon the first and second carriages advantageously allows coordinated horizontal rolling movements of the first and second carriages to infinitely or continuously position the second carriage (and other structures including food items thereby carried) at any location within a horizontal plane residing oppositely longitudinally from the oppositely longitudinal end of the at least first baking case.

The fourth conveyor component of the instant inventive conveyor tunnel oven preferably comprises a rigid vertically extending shaft or beam whose upper end is mounted rotatably upon the second carriage. In the preferred embodiment, the shaft has a downwardly suspending vertical length which is sufficient to oppositely longitudinally span and overlie the oppositely longitudinal end of each case among the at least first and plurality of second baking cases. Rotation of the fourth conveyor preferably centers upon and is about a vertical axis which resides within or is adjacent to the vertical shaft.

A further structural component of the instant inventive conveyor tunnel oven comprises a fifth conveyor which is preferably configured to include a third carriage. In the preferred embodiment, the third carriage is movably mounted upon the fourth conveyor's vertical shaft in a manner which facilitates alternative upward and downward movements of the third carriage along such shaft. The fifth conveyor preferably further comprises a first and preferably first and second or laterally paired food item engaging arms. Proximal ends of such arms are preferably fixedly attached to the third carriage, and the distal ends of such arms preferably cantilever substantially horizontally therefrom. Upon rotation of the vertical shaft about the vertical axis, the distal ends of such arms advantageously execute orbital food item conveying motions.

Further structural components of the instant inventive conveyor tunnel oven comprise a plurality of linear motion actuators, each linear motion actuator being connected operatively to one of the carriages. Preferred linear motion actuators which operatively engage the first and second carriages comprise continuous loop chain and sprocket drive assemblies. For purposes of compactness, the preferred linear motion actuator provided for operative engagement with the third carriage comprises a ball screw actuator whose traveling nut is fixed to the third carriage. Other types of linear motion actuators which may be operatively connected to and may alternatively drive the invention's carriage components include toothed belt drive actuators, rack and pinion gear actuators, and jack screw actuators. A rotary motion actuator, preferably a reversible electric motor, is preferably connected operatively to the upper end of the fourth conveyor's vertical shaft for alternatively rotating and counter-rotating such shaft about the vertical axis, such rotary motion actuator being supported by and carried upon the second carriage component.

The instant invention's second, third, fourth, and fifth conveyor components are preferably powered and driven by computer processor controlled stepper motors or servo motors. Utilization of such motors advantageously allows for automated computer processor control of simultaneous motions of the fifth conveyor's food item engaging arms with respect to four axes, they being the longitudinal axis (i.e., motion of the first carriage), the lateral axis (i.e., motion of the second carriage), the vertical axis (i.e., motion of the third carriage), and a rotary axis (i.e., rotary motion of the fourth conveyor's shaft).

Simultaneous computer controlled actuation of the invention's second, third, fourth, and fifth conveyors advantageously allows the food item engaging arms to perform continuous, uninterrupted and automated motions along any prescribed or programmed path within a three dimensional volumetric space defined at the oppositely longitudinal end of the conveyor tunnel oven. Such computer controlled motion of the food item engaging arms advantageously allows such arms to variously engage and pick up uncooked food items such as pizzas contained within storage racks placed near the oppositely longitudinal end of the conveyor tunnel oven, and to transfer such food items to a selected oppositely longitudinal conveyor tunnel oven food item passage port. Replication of such structures at the longitudinal end of the conveyor tunnel oven may similarly advantageously provide automated off-loading of cooked pizzas at the output end of the oven, automatically transferring cooked pizzas to a prescribed longitudinal location for further processing such as pizza cutting and boxing. In a preferred embodiment, a pair of four axis motion control food item transferring assemblies, as described above, is incorporated into the tunnel oven, one at each end of the oven.

Accordingly, objects of the instant invention include the provision of a conveyor tunnel oven which incorporates structures as described above, and which arranges those structure in manners described above, for the performance of beneficial functions described above.

Other and further objects, benefits, and advantages of the instant invention will become known to those skilled in the art upon review of the Detailed Description which follows, and upon review of the appended drawings.

BRIEF DESCRIPTION OF THE DRAWINGS

FIG. 3 is a partial and magnified view of an alternate portion of the structure depicted in FIG. 1.

DETAILED DESCRIPTION OF A PREFERRED EMBODIMENT

Figure 1:
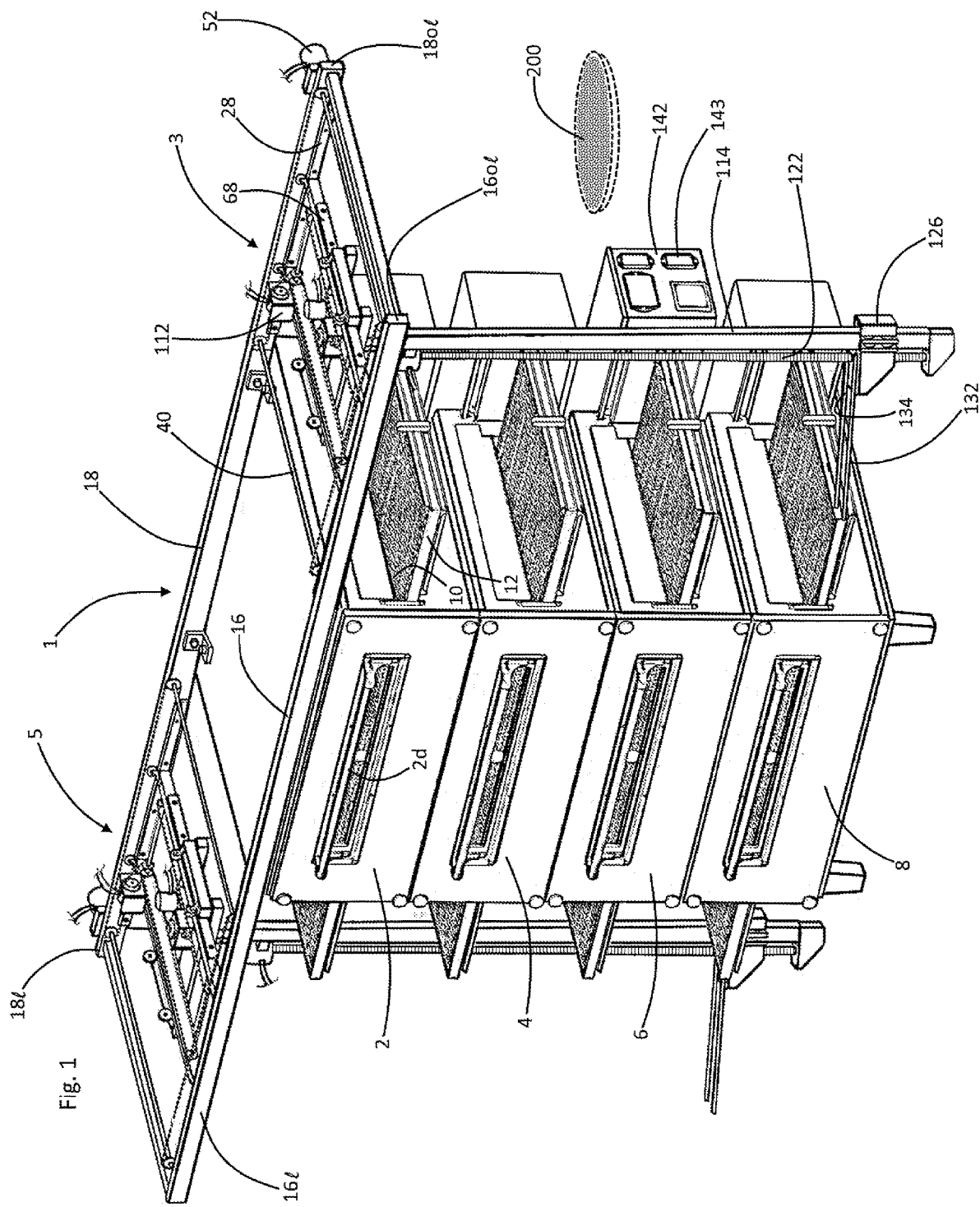
FIG. 1 is a perspective view of a preferred embodiment of the instant inventive conveyor tunnel oven.

Referring now to the drawings and in particular to Drawing FIG. 1, a preferred embodiment of the instant inventive conveyor tunnel oven is referred to generally by Reference Arrow 1. The conveyor tunnel oven 1 comprises at least a first baking case 2, such case having upward and downward ends, lateral and oppositely lateral ends, and longitudinal and oppositely longitudinal ends. The upper end of the baking case 2 is upward according to the view of FIG. 1, and the lateral or front end of the baking case 2 is assumed, for example, to coincide with a front panel side having an access door 2d. In the view of FIG. 1, the oppositely longitudinal end of the conveyor oven is assumed (only for the sake of example) to be the rightwardly oriented end wall, such end having an oppositely longitudinal food passage port 10. The longitudinal end of the at least first baking case 2 (not depicted within views) similarly has a longitudinal food passage port. A wire grate type continuous loop food conveyor 12 extends longitudinally through the baking case 2, such conveyor 12 constituting a first conveyor component of the instant conveyor tunnel oven 1.

Figure 2:
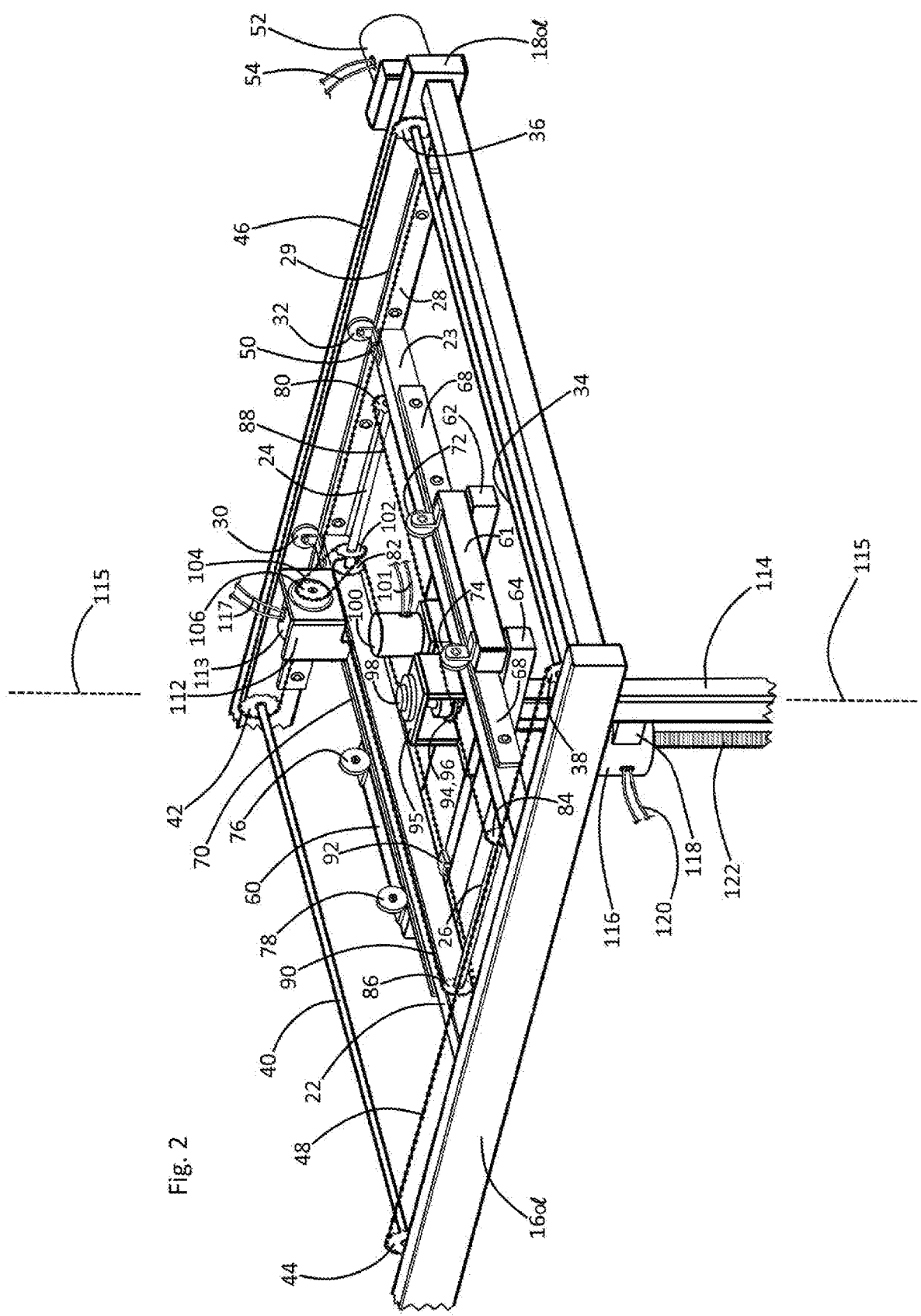
FIG. 2 is a partial and magnified view of a portion of the structure depicted in FIG. 1.

Referring simultaneously to FIGS. 1 and 2, the instant inventive conveyor tunnel oven 1 includes a second conveyor component comprising a first carriage which is preferably configured as a rigid rectangular frame. In the example of FIG. 2, laterally extending crossbars 22 and 23, in combination with longitudinally extending rotary axles 24 and 26, may form the first carriage's rectangular frame component. Suitably, additional longitudinally extending bars (not depicted within views) may span between crossbars 22 and 23 in further formation of the first carriage's frame. The first carriage 22,23,24,26 is preferably upwardly supported at the oppositely longitudinal end of the first baking case 2, such carriage being adapted for transporting attached structures in the longitudinal or oppositely longitudinal direction with respect to food passage port 10.

Such operative carriage support and motion is suitably provided by mounting lateral and oppositely longitudinal support beams 16 and 18 at the upper end of the at least first baking case 2, such beams having cantilevering oppositely longitudinal extensions 16$o\ell$ and 18$o\ell$. An oppositely lateral roller track 28 is fixedly mounted to the inner surface of the cantilevering extension 18$o\ell$ of beam 18, and a similar laterally mounted roller track (not within views) is mirroringly mounted to the cantilevering extension 16$o\ell$ of beam 16. Rollers 30 and 32 mounted on carriage frame members 22 and 23 rollably engage the upper surface 29 of the oppositely lateral roller track 28, and similar rollers mounted at the lateral ends of first carriage frame members 22 and 23 (not within views) similarly rollably engage such mirroring lateral roller track mounted to the inner surface of cantilevering beam extension 16$o\ell$. The rolling engagement of the first carriage 22,23,24,26 with the cantilevering beams 16$o\ell$ and 18$o\ell$ advantageously allows such carriage, along with all components attached to such carriage, to freely rollably move along the longitudinal axis toward or away from the first case's oppositely longitudinal food passage port 10, and toward or away from the oppositely longitudinal end of the first conveyor 12.

The cantilevering beams 16$o\ell$ and 18$o\ell$ are representative of a suitable and exemplary means for longitudinally movably mounting the invention's first carriage component. Other common means for longitudinally movably supporting the invention's second conveyor including its first carriage component (such as floor mounted tracks, wall mounted tracks, ceiling mounted tracks, or various other points of track mounting support with respect to the baking cases) are considered to fall within the scope of the invention.

The instant inventive conveyor tunnel oven 1 preferably comprises a third conveyor which suitably incorporates a second carriage. In the preferred embodiment, the second carriage is configured similarly with the first carriage to include a rigid rectangular frame 60,61,62,64. Like the rolling mount of the second conveyor's carriage (i.e., first carriage 22,23,24,26), the third conveyor's carriage (i.e., second carriage 60,61,62,64), is operatively mounted upon the second carriage for lateral and oppositely lateral rolling motions. Roller tracks 70 and 68 are attached to frame members 22 and 23, such tracks aligning with the lateral axes for rolling engagements with frame attached rollers 72,74,76,78. Such rolling mount of the second carriage facilitates free lateral and oppositely lateral rolling motions which, in combination with the above described free longitudinal and oppositely longitudinal rolling motions of the first carriage 22,23,24,26, allow components carried by the second carriage to freely move infinitely or continuously within a horizontal plane.

Referring simultaneously to all figures, a fourth conveyor component of the instant inventive conveyor tunnel oven 1 comprises a vertically extending suspension shaft 114. The upper end of shaft 114 is preferably rotatably mounted to the second carriage 60,61,62,64 by means of an upper rotary bearing 98, such bearing being supported within and upon an upper bearing housing 95, such housing 95 being fixedly attached to the carriage 60,61,62,64. During the above described infinitely variable horizontal plane movement of carriage 61,61,62,64, the fourth conveyor, which includes vertical shaft 14, matches such horizontal motion and may additionally move rotatably about the shaft's vertical axis 115.

A fifth conveyor component of the instant invention comprises a third carriage 126 which is vertically movably mounted upon vertical shaft 114. Similarly with the laterally rolling mount of carriage 60,61,62,64 upon carriage 22,23, 24,26, and similarly with that carriage's rolling mount upon canti-levering beam extensions 16$o\ell$ and 18$o\ell$, the third carriage 126 is rollably mounted upon the fourth conveyor's shaft 114 by means of rollers 124 and 125, such rollers utilizing side walls of shaft 114 as roller tracks. Simultaneous operation of the invention's second, third, and fifth conveyors advantageously allows the third carriage 126 to freely and infinitely variably move within a volume of space defined at the oppositely lateral end of the at least first baking case 2.

The invention's fifth carriage component further comprises at least a first and preferably a pair of food item engaging tines or arms 132 and 134, such arms having their proximal ends fixedly mounted upon carriage 126. Operation of the fourth conveyor to rotate and angularly orient the arms 132 and 134 may occur simultaneously with the above described infinitely variable three dimensional motion of carriage 126 which may be effected via simultaneous actuations of the second, third, and fifth conveyors. Orbiting rotation of arms 132 and 134 about vertical axis 115 facilitates conveyance of food items with respect to a fourth axis of motion, in addition to motions along the first, second, and third motion axes which are facilitated by the first, second, and third carriages.

Referring in particular to FIG. 1, a pizza pan containing an uncooked pizza 200 is drawn in dashed lines, and such pizza and pan may be assumed to be supported by a storage rack (not depicted within view) which is positioned near the oppositely longitudinal end of the conveyor tunnel oven 1. In use of the inventive conveyor tunnel oven, an operator may initially operate the fifth conveyor to upwardly or downwardly move the food item engaging arms 132 and 134 until such arms reside at an elevation matching the elevation of the pizza and pan 200. Thereafter (or simultaneously), the operator may actuate the fourth conveyor to rotatably re-orient arms 132 and 134 until they point directly toward the pizza pan 200. Thereafter (or simultaneously), the operator may actuate the second and third conveyors, moving their first and second carriages (and including the fourth conveyor's shaft 114 which is attached to those conveyors) toward the pizza and pan 200, such actuations guiding the arms 132 and 134 into engagement with such pan. Such conveyor actuations are preferably performed substantially simultaneously through computer processor control, as described below.

Reversals of such conveyor actuations may effectively transport the pizza and pan 200 to a resting point upon the oppositely longitudinal end of the first conveyor 12. Thereafter, the first conveyor 12 may longitudinally carry the pizza and pan 200 through the oppositely longitudinal food passage port 10 for cooking within baking case 2.

The instant inventive conveyor tunnel oven 1 preferably further comprises a plurality of second baking cases 4, 6, and 8, each such case underlying the uppermost and at least first baking case 2, and each such case suitably being configured substantially identically with such case 2. Operations of the invention's second, third, fourth, and fifth conveyors, as described above, may alternatively and selectively transport food items such as the pizza and pan 200 to the intake food passage port of any one of the second baking cases 4, 6, and 8.

Referring to FIG. 2, a chain drive type linear motion actuator is preferably provided, such actuator comprising an oppositely longitudinal drive axle 34, a longitudinal idler axle 40, an oppositely lateral drive sprocket 36, a lateral drive sprocket 38, an oppositely lateral idler sprocket 42, a lateral idler sprocket 44, an oppositely lateral continuous loop drive chain 46 engaging sprockets 42 and 46, and a lateral continuous loop drive chain 48 engaging sprockets 44 and 38. Operation of such chain drive type linear motion actuator may longitudinally or oppositely longitudinally move the first carriage 22,23,24,26 along beams 16o𝓁 or 18o𝓁. To facilitate such motion, the oppositely lateral end of carriage frame member 23 is fixedly mounted to the lower flight of oppositely lateral drive chain 46 via chain linkage 50, and a similar linkage (not depicted within views) connects the lower flight of the lateral drive chain 48 with the lateral end of carriage frame member 23. In operation of such chain drive linear motion actuator, powered rotations and counter-rotations of the drive axle 34 effectively move the first carriage 22,23,24,26 along the longitudinal motion axis.

Referring further to FIG. 2, a similar linear motion actuator including oppositely lateral drive axle 24, lateral idler axle 26, oppositely longitudinal drive sprocket 80, longitudinal drive sprocket 82, oppositely longitudinal idler sprocket 84, longitudinal idler sprocket 86, continuous loop oppositely longitudinal drive chain 88, and continuous longitudinal drive chain 90 may similarly laterally or oppositely laterally move the second carriage 60,61,62,64. To facilitate such motion, the lower flight of drive chain 90 may be mechanically linked with carriage frame member 64 via chain linkage 92, and a similar chain linkage (not depicted within views) may attach the lower flight of drive chain 88 to the oppositely longitudinal end of carriage frame member 64. The dual and orthogonally oriented drive chain linear motion actuators which effectively move the first and second carriage frames 22,23,24,26, and 60,61,62,64, are intended as being representative of toothed drive belt actuators, rack and pinion gear actuators, ball screw actuators, and jack screw actuators which may be suitably substituted.

Referring simultaneously to FIGS. 2 and 3, a ball screw linear motion actuator is depicted, such actuator comprising a rotatable screw shaft 122 whose lower end is mounted by a rotary bearing 128 which is supported upon a lower foot bracket 130 extending from the lower end of shaft 114. Such ball screw type linear motion actuator preferably includes a friction minimizing ball bearing adapted nut which is fixedly housed within carriage extension 127, such nut helically threadedly engaging screw shaft 122.

In operation of the ball screw linear motion actuator, turning and counter-turning of the screw shaft 122 effectively raises and lowers the captured ball screw nut, simultaneously raising or lowering the carriage 126,127 and its attached food item engaging arms 132 and 134. The depicted ball screw linear motion actuator may be suitably utilized in place of or as a substitute for the chain drive, belt drive, and rack and pinion type linear motion actuators described above. Correspondingly, those actuator types may suitably be substituted for the ball screw actuator.

The linear motion actuator components of the instant inventive conveyor tunnel oven are driven by rotary power sources which preferably comprise reversible electric motors 52, 116, and 113. Electric motor 52 is mounted to beam 18o𝓁, such motor directly powering drive shaft 34 and sprockets 36 and 38. The reversible electric motor 116 similarly directly rotatably turns screw shaft 112, such motor 116 being mounted at the upper end of vertical shaft 114 by a mounting bracket 118. Electric motor 113 is mounted to the first carriage's frame member 22 via mounting bracket 112, such motor indirectly driving shaft 24 via sprocket and chain drive assembly 102,104,106. A fourth electric motor 100 operatively turns and counter-turns vertical shaft 114 about vertical axis 115 via a chain and sprocket drive 94,96 housed within bearing housing 95, such housing being mounted to and carried upon the second carriage.

Each of the four electric motors 52, 100, 113, and 116 preferably comprises a computer processor controlled stepper motor or a servo motor and, referring further to FIG. 1, their electrical power and data lead cables 54, 117, 101, and 120 may suitably extend to and electrically communicate with a control case 142 which houses such processor. User input touch screens 143 preferably facilitate programmed control of the rotations of motors 52, 100, 113, and 116 along with the correspondingly controlled four axis motions of the invention's four conveyors.

Structures indicated by Reference Arrow 3 in FIG. 1 are representative of components of the instant inventive conveyor tunnel oven where the input end of the tunnel oven is characterized (for the sake of example) as constituting the oppositely longitudinal end of the oven. A substantially mirroring replication of such structures 3 supported by longitudinal beam extensions 16ℓ and 18ℓ is denoted by Reference Arrow 5. Such structures 5 repeated at the longitudinal or output end of the oven may be alternatively characterized as residing at the oven's oppositely longitudinal end, and under such characterization, the mirroring assembly 5 may be assumed to primarily function to oppositely longitudinally offload cooked food items which are dispensed by the oven following cooking. In a preferred embodiment, second, third, fourth, and fifth conveyors configured as described above are mounted to both ends of the oven.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. A conveyor tunnel oven for baking a food item, the conveyor tunnel oven comprising:
    (a) at least a first baking case having upward and downward ends, having lateral and oppositely lateral ends, and having longitudinal and oppositely longitudinal ends, the at least first baking case being opened by longitudinal and oppositely longitudinal food passage ports respectively positioned at said longitudinal and oppositely longitudinal ends;
    (b) a first continuous loop conveyor extending through the at least first baking case, the first continuous loop conveyor being adapted for carrying the food item from one of the ports among the longitudinal and oppositely longitudinal food passage ports to the other port among said ports;
    (c) a longitudinally moveable carriage operatively supported at the oppositely longitudinal end of the at least first baking case, the longitudinally moveable carriage being adapted for carrying the food item longitudinally or oppositely longitudinally with respect to the oppositely longitudinal food passage port;
    (d) a laterally moveable carriage carried by the longitudinally moveable carriage, the laterally moveable carriage being adapted for carrying the food item laterally or oppositely laterally with respect to the oppositely longitudinal food passage port;
    (e) a vertical shaft carried by the laterally and longitudinally moveable carriages, the vertical shaft extending vertically along an axis and being adapted for carrying the food item orbitally about the axis; and
    (f) a vertically moveable carriage carried by the vertical shaft, the vertically moveable carriage being adapted for carrying the food item upwardly or downwardly with respect to the oppositely longitudinal food passage port.

2. The conveyor tunnel oven of claim 1 comprising a second baking case underlying the at least first baking case, the second baking case being opened by oppositely longitudinal and longitudinal food passage ports, and further comprising a plurality of second continuous loop conveyor extending through one of the second baking case, the second continuous loop conveyor being adapted for alternatively carrying the food item within the second baking case.

3. The conveyor tunnel oven of claim 2 wherein each continuous loop conveyor comprises a wire grate belt.

4. The conveyor tunnel oven of claim 3 wherein the longitudinally moveable carriage comprises a roller carriage.

5. The conveyor tunnel oven of claim 4 wherein the laterally moveable carriage comprises another roller carriage.

6. The conveyor tunnel oven of claim 5 wherein the vertical shaft has an upper end mounted rotatably upon the laterally moveable carriage.

7. The conveyor tunnel oven of claim 6 wherein the vertically moveable carriage supports at least a first arm.

8. The conveyor tunnel oven of claim 7 further comprising a second arm fixedly attached to the vertically moveable carriage.

9. The conveyor tunnel oven of claim 7 further comprising a plurality of linear motion actuators, each linear motion actuator being connected operatively to one of the carriages.

10. The conveyor tunnel oven of claim 9 wherein each linear motion actuator comprises a drive mechanism selected from the group consisting of chain drives, belt drives, ball screw actuators, jack screw actuators, and rack and pinion gear drives.

11. The conveyor tunnel oven of claim 9 further comprising a plurality of roller and roller track combinations, each such combination being mounted operatively to one of the carriages.

12. The conveyor tunnel oven of claim 11 further comprising a plurality of stepper or servo motors, each motor among the plurality of stepper or servo motors being connected operatively to the vertical shaft or to one of the linear motion actuators.

13. The conveyor tunnel oven of claim 12 further comprising a programmable digital control unit operatively communicating with the stepper or servo motors.

14. The conveyor tunnel oven of claim 1 further comprising a pair of cantilevering beams, said beams providing the operative support of the longitudinally moveable carriage.

* * * * *